United States Patent [19]

Spurney

[11] 3,926,566

[45] Dec. 16, 1975

[54] PROCESSING ALKALI METAL HALIDE SALTS FOR GROWING INTO CRYSTALS IN ACCORDANCE WITH STOCKBARGER PROCESS

[75] Inventor: Richard W. Spurney, Solon, Ohio

[73] Assignee: Bicron Corporation, Newbury, Ohio

[22] Filed: Sept. 12, 1974

[21] Appl. No.: 505,475

Related U.S. Application Data

[63] Continuation-in-part of Ser. No. 361,656, May 18, 1973, abandoned.

[52] U.S. Cl. ......... 23/301 SP; 23/293 R; 23/302 R; 23/303
[51] Int. Cl.² ... B01D 9/00; C01D 3/12; B01J 17/08
[58] Field of Search ....... 23/301 SP, 273 SP, 302 R, 23/293 R, 293 A, 303, 300

[56] References Cited
UNITED STATES PATENTS

| | | | |
|---|---|---|---|
| 2,149,076 | 2/1939 | Stockbarger | 23/302 R |
| 3,020,132 | 2/1962 | Gunther-Mohr | 23/273 SP |
| 3,164,328 | 1/1965 | Dornick | 23/301 SP |
| 3,766,080 | 10/1973 | Swinehart | 23/302 |

FOREIGN PATENTS OR APPLICATIONS

| | | | |
|---|---|---|---|
| 192,186 | 6/1967 | U.S.S.R. | 23/301 SP |
| 194,215 | 2/1965 | Switzerland | 23/301 SP |

OTHER PUBLICATIONS

Butler et al., A Method For Purification and Growth of KCl Single Crystals, Feb. 1966, pp. 1–39.

*Primary Examiner*—Jack Sofer
*Assistant Examiner*—S. J. Emery
*Attorney, Agent, or Firm*—Bosworth, Sessions & McCoy

[57] ABSTRACT

A process of drying and packing purified alkali halide salts into a crucible wherein the salts are formed into dense cakes of slightly smaller cross-sectional shape than that of the crucible and are packed into the crucible. The salts are melted and grown into optical or scintillation-type crystals in accordance with the Bridgeman-Stockbarger technique.

4 Claims, No Drawings

PROCESSING ALKALI METAL HALIDE SALTS FOR GROWING INTO CRYSTALS IN ACCORDANCE WITH STOCKBARGER PROCESS

CROSS REFERENCE TO RELATED APPLICATION

This application is a continuation-in-part application of my earlier filed U.S. Application Ser. NO. 361,656, filed May 18, 1973, now abandoned.

BACKGROUND OF THE INVENTION

This invention relates to the manufacture of alkali metal halide crystals by the Bridgeman-Stockbarger process for use as optical or scintillation crystals. The Bridgeman-Stockbarger process is disclosed in U.S. Pat. No. 2,149,076. In the commercial form of this process as presently followed in the art, purified alkali metal halide salts, such as sodium iodide in mixed lumpy grain crystalized form, are loaded into a platinum crucible. The crucible may be from 13 to 17 inches or more in diameter and twice as high as the diameter. The crucible is filled to the top with the purified alkali metal halide salt powder and is placed in a furnace. The furnace is designed and programmed so that there is an upper hot region having a temperature above the melting point of the salt and a lower cooler region having a temperature below the melting point of the salt. The crucible is first left in the hot upper portion of the furnace until the halide salt has all melted and reached a uniform temperature. In melting, the salt shrinks to approximately one-third of its initial height. The crucible with the molten salt is then lowered very slowly from the hot region into the cooler region at the rate of approximately ¾ inch per day so that the salt solidifies at an interface layer and forms a single solid crystal. It may take two-and-one-half to three weeks to grow a crystal in this manner. The crystal thus formed is removed and processed as known in the art.

The purity of the alkali halide salt is critical to the formation of good crystals, both from an optical or scintillation viewpoint. U.S. Pat. Nos. 2,640,755 (Hay) and 3,002,811 (Johnson) describe some of the processes for purifying alkali halide salts.

In accordance with the known prior art Bridgemean-Stockbarger crystal-growing processes, the alkali halide salt is poured into the platinum crucible in a dry grain form and then is tamped or otherwise compacted to incorporate as much salt in the crucible as is reasonably possible. The crucible is made of relatively thin platinum. Since platinum for crucibles costs approximately $150 per ounce, the crucible is no thicker than absolutely necessary and it has to be handled very carefully. While the halide salts can be tamped and densified to a certain extent, such tamping has to be restrained and controlled because the crucible can easily be damaged.

In maintaining the purity of the sodium iodide salt, formation of hydrated sodium iodide is to be avoided. Formation of this compound is avoided so long as the salt, whether dry, damp or in slurry form, is kept on the acid side and above approximately 175°F. Similar conditions apply to the other alkali halide salts. Hydroxides of the alkali halide salts, which are formed when hydrated sodium iodide is heated above 220°F. in particular are troublesome, bad impurities.

In accordance with my invention, I have discovered a process whereby the purity of the salt is improved over the prior art processes and the salt is loaded into the crucible in a much denser condition so that for each two-and-one-half to three-week crystal-growing cycle, for the same size crucible, the efficiency is increased on the order of at least twenty-five percent.

My process starts with a hot slurry from prior art purification processes such as shown in U.S. Pat. No. 3,002,811. The hot slurry is placed in a flat-bottomed Buchner funnel over a filter and under a vacuum so that the mother liquor is drawn off. This vacuum filtration process leaves a damp salt. Within about 5 minutes, approximately 75% of the liquid is thus drawn off. The hot slurry starts at perhaps 275°F. and the operation proceeds fast enough so that it never goes below about 175°F. This leaves a hot damp salt.

For the next step in my process, the damp alkali halide salt is placed in titanium trays which have the cross-sectional shape of the crucible but are slightly smaller. The walls of the trays have a slight angle or taper to permit removal of the cake formed therein. The trays must be of a metal which will not contaminate or be attacked by the halide salt or the hydriodic acid used in the processing, in other words, contamination-proof material. Suitable metals are titanium, tantalum and platinum and some alloys of the same. Neither glass nor enamel is suitable for this purpose. For a 17-inch diameter crucible of circular cross-section, for instance, the tray should be approximately 16½ inches in diameter and also circular in cross section.

At this point, there is still some water present in the salt. In order to eliminate this water, the trays are put in an oven and kept at about 350°F. with an oven temperature variation of perhaps plus or minus 5° for approximately 15 hours. The objective is to evaporate off the water slowly. Too rapid evaporation results in a boil-over effect, which is to be avoided. The temperature may be lowered to about 330°F. or increased to about 370°F. Lower temperatures require longer times and higher temperatures may give too rapid evaporation. While any temperature over 212°F. will be satisfactory because it will "boil-off" the water, the preferred range is about 330° to 370°F., preferably about 350°F. In other words, a temperature of 250°F. will ultimately drive off all of the water but it will take a long time and be less efficient. This temperature and time varies somewhat with the tray size and thickness, thinner and smaller trays requiring less time while larger trays require proportionally longer time.

As the next step in the process, the temperature of the oven is increased to between 450° and 550°F., preferably about 475°–500°F., and the salt is kept at that temperature for at least 24 hours. This completely drives off the remaining water. This is an important step because it insures a completely dry salt which eliminates the possibility of hydroxide formation. This results in crystals of superior performance. It is, however, possible to eliminate this step and still obtain most of the benefits of the present invention. In such a situation, you have a process which is less efficient than the preferred process but one which is still better than prior art processes.

Finally, the oven temperature is lowered to about 250°F. The purpose is to bring the temperature down so that the trays can be handled, but still stay safely above the temperature at which hydrated sodium iodide might be formed. On a production basis, this temperature should not be less than about 200°F. At this point, the salt in the trays has coalesced into cakes having the shape of the trays. These cakes are relatively dense and can be handled without falling apart. The trays have to be knocked to loosen the cakes.

Most of the salt cakes are then loaded directly into the platinum crucible. One or more of the cakes, however, is crushed into powder in a hot Pfaudler pot and the powder is used to fill up the bottom of the crucible and the edges, cracks and interstices around the cakes. Most crucibles have conical bottoms, often 135° cones or noses. The powder is put in this conical nose portion until it reaches just above the shoulder, at which point the crucible is filled up with the cakes. Powder is then disposed over the cakes to fill up the cracks. Most of the powder is relatively fine grained. Mixed up in the powder, however, may be larger lumps which are suitably fitted into the crucible cone. No effort need be made to break the cakes up into even-sized powder grains.

The term "alkali metal halide" refers to sodium, potassium, lithium, rubidium and cesium salts with fluorides, chlorides, bromides and iodides. By far the most commonly used salt for crystal growth is sodium iodide. Its use as a scintillator is disclosed in Hofstadter U.S. Pat. No. 2,585,551.

The following example illustrates the present invention:

A 17-inch platinum crucible was used in a Bridgeman-Stockbarger process and took 18 days to grow a sodium iodide thalium activated crystal cylinder approximately 7½ inches high.

The total height of the crucible was 30 inches. The conical portion had a 135° angle and was 3½ inches high. The cylindrical portion was 26½ inches high. Loaded right up to the top of the crucible in the conventional manner, from 300 to 320 pounds of sodium iodide could be accommodated. This produced in 18 days a cylinder 7½ inches high of good crystal. The cone portion was cut off and discarded.

Following the process described herein, seven cakes approximately 16½ inches by 3½ inches were formed. One cake was broken up in a Pfaudler mill and put in the cone. The other six were placed on top of one another in the crucible up to the top. Between 390 and 400 pounds of sodium iodide salt was thus loaded into the crucible. It took 22 days to grow a crystal. Cutting off the unuseable cone as before left 11½ inches of useable cylinder crystal vs. 7½ inches by the prior art process. By reason of the heating and drying process as described, the crystals have superior performance.

Integrally-mounted 3 inches × 3 inches crystal assemblies consistently give resolutions of 6.2 to 6.7% at 662 KeV, cesium 137 isotope. Previously the comparable resolution range was 7 to 8%.

Having thus described my invention, I claim:

1. In the growing of alkali metal halide salt crystals by the Bridgeman-Stockbarger process, the steps of purifying the halide salt to obtain a hot slurry, drawing off most of the mother liquor from the purified halide salt slurry by a vacuum filtration process to leave a hot damp salt, placing the damp salt in contamination-proof metal trays of identical but slightly smaller cross-sectional shape than that of the crystal-growing crucible, putting the trays in an oven and holding them there for at least 15 hours at a temperature in excess of 212°F., long enough to drive off all of the water from the salt cakes, lowering the oven temperature to not less than 200°F. so that the salt cakes thus formed can be handled, removing the cakes from the trays, breaking up into a powder some of the cakes and filling up the cone portion of the crucible, placing the remaining hot cakes in the crucible and filling the cracks and interstices with the remaining powder to obtain as much salt in the crucible as feasible, and thereafter growing the crystal.

2. In the growing of alkali metal halide salt crystals by the Bridgeman-Stockbarger process, the steps of purifying the halide salt to obtain a hot slurry, drawing off most of the mother liquor from the purified halide salt slurry by a vacuum filtration process to leave a hot damp salt, placing the damp salt in contamination-proof metal trays of identical but slightly smaller cross-sectional shape than that of the crystal-growing crucible, putting the trays in an oven and holding them there for at least 15 hours at from 330° to 370°F., increasing the oven temperature to between 450° and 550°F. for at least 24 hours, lowering the oven temperature to not less than 200°F. so that the salt cakes thus formed can be handled, removing the cakes from the trays, breaking up into a powder some of the cakes and filling up the cone portion of the crucible, placing the remaining hot cakes in the crucible and filling the cracks and interstices with the remaining powder to obtain as much salt in the crucible as feasible, and thereafter growing the crystal.

3. A process of drying and packing alkali halide salt crystals into a crucible for growing in accordance with the Bridgeman-Stockbarger process wherein the crystals are kept above at least 175°F. comprising the steps of a. purifying the alkali metal halide salt to form a slurry,
b. separating the salt crystals from the mother liquor to obtain damp salt crystals,
c. placing the damp salt crystals in contamination-proof trays with the same but slightly smaller cross-sectional shape than that of the crystal-growing crucible,
d. putting such salt-filled trays in an oven at from 330° to 370°F. for at least 15 hours,
e. increasing the oven temperature to from 450° to 550°F. for at least 24 hours,
f. lowering the oven temperature to a temperature at which the salt crystal cakes thus formed in the trays can be handled, such temperature being at least 200°F.,
g. breaking up a small portion of the cakes into powder to fill the bottom of the crucible and the interstices between the cakes,
h. placing most of the hot salt cakes in the crucible, and
i. thereafter placing the crucible in a furnace and growing crystals in accordance with the Bridgeman-Stockbarger process.

4. The process of claim 3 above in which the contamination-proof trays are made from a metal is selected from the group consisting of titanium, tantalum and platinum, the alkali metal halide salt is sodium iodide, adn the temperature of step (d) is about 350°F., the temperature of step (e) is about 500°F., and the temperature of step (f) is about 250°F.

* * * * *